(12) United States Patent
Melen

(10) Patent No.: US 6,374,301 B1
(45) Date of Patent: Apr. 16, 2002

(54) DATA NETWORK COMMUNICATIONS

(75) Inventor: Björn Melen, Espoo (FI)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/330,177

(22) Filed: Jun. 11, 1999

(30) Foreign Application Priority Data

Jun. 12, 1998 (FI) .................................................. 981364

(51) Int. Cl.⁷ .............................................. G06F 15/16
(52) U.S. Cl. ...................................................... 709/232
(58) Field of Search .............................. 709/232, 223, 709/229, 250

(56) References Cited

U.S. PATENT DOCUMENTS

| | | | |
|---|---|---|---|
| 5,586,121 A | 12/1996 | Moura et al. ................ | 370/404 |
| 5,717,690 A | 2/1998 | Peirce, Jr. et al. .......... | 370/389 |
| 5,761,416 A * | 6/1998 | Mandal et al. .............. | 709/250 |
| 6,041,354 A * | 3/2000 | Biliris et al. ................ | 709/226 |
| 6,067,557 A * | 5/2000 | Hedge ........................ | 709/103 |
| 6,137,777 A * | 10/2000 | Vaid et al. .................. | 370/230 |
| 6,144,994 A * | 11/2000 | Mizera et al. .............. | 709/212 |
| 6,167,445 A * | 12/2000 | Gai et al. .................... | 709/223 |
| 6,272,546 B1 * | 8/2001 | Ludtke ........................ | 709/231 |
| 6,304,549 B1 * | 10/2001 | Srinivasan et al. ......... | 370/230 |

FOREIGN PATENT DOCUMENTS

| | | |
|---|---|---|
| EP | 0 828 362 | 3/1998 |
| WO | WO 97/22224 | 6/1997 |
| WO | WO 98/20653 | 5/1998 |
| WO | WO 98/45984 | 10/1998 |
| WO | WP 98/54868 | 12/1998 |

OTHER PUBLICATIONS

K. Sklower, et al., Internet Engineering Task Force: The PPP Multilink Protocol (MP), RFC (Request for Comments): 1900, Aug. 1996, pp. 1–24.

* cited by examiner

Primary Examiner—David Y. Eng
(74) Attorney, Agent, or Firm—Burns, Doane, Swecker & Mathis, L.L.P.

(57) ABSTRACT

A method of connecting a subscriber terminal to the Internet, wherein the connection is made through an exchange of a public telephone network and the exchange has a plurality of Internet access servers (IASs). In response to a request received from the subscriber terminal, it is determined whether or not an active connection currently exists for that terminal over one of the IASs. If an active connection does not currently exist, transmission bandwidth on one of the IAS is allocated to the subscriber terminal. If an active connection does exist, the IAS on which transmission bandwidth is allocated is identified, and additional bandwidth allocated to the terminal on that IAS if available. If sufficient additional bandwidth is not available, the active connection is transferred to a second IAS on which sufficient bandwidth is available.

10 Claims, 3 Drawing Sheets

DATA NETWORK COMMUNICATIONS

FIELD OF THE INVENTION

The present invention relates to data network communications and in particular to a switching point of a data network having a plurality of network access servers.

BACKGROUND OF THE INVENTION

The conventional way for a home user of a personal computer (PC) to access the Internet is to set up a telephone call, via his telephone operator, to an Internet service provider. The service provider allocates an Internet address to the PC ("subscriber terminal") for the duration of a session and acts as a protocol converter for data transmitted between the Internet and the subscriber terminal.

More recently, it has been proposed to combine the functionality of the Internet service provider into certain exchanges of the telephone network. An advantage of this is that the subscriber need only receive a single bill for both telephone calls and Internet access.

Exchanges provided with this facility are accessed by subscribers dialling a predefined access number. The exchanges contain "intelligence" which enables them to recognise that a call received to this number is an Internet access request. In response, the exchange provides a connection between the subscriber terminal and the Internet via one of a number of so-called Internet Access Servers (IASs)—alternatively known as Network Access Servers (NASs).

The connection between the subscriber terminal and the IAS is a circuit switched connection, i.e. occupying reserved bandwidth, and utilises a Point-to-Point Protocol (PPP) such as is defined in RFC 1661. The reserved bandwidth comprises one Integrated Services Digital Network (ISDN) traffic channel (B-channel) providing a bandwidth of 64 Kbits/sec.

The number of IASs provided at an exchange determines the Internet access capacity of the exchange. However, using PPP, the bandwidth which can be accessed by an individual subscriber is limited to 64 Kbits/sec (i.e. one ISDN B-channel).

A Multilink PPP (RFC 1990 (1717)(1934)) has been proposed in order to provide further transmission bandwidth to subscriber terminals. This protocol uses a combination of two or more connections to provide a single larger channel. Considering for example the situation where the subscriber line to the exchange makes use of the Integrated Services Digital Network (ISDN) user-network interface, it is possible to make use of both of the communication B-channels available on the subscriber line for Internet access.

This works satisfactorily as long as all of the individual B-channels making up the multilink channel terminate at the same IAS. However, Multilink PPP cannot operate where individual B-channels are provided via different IAS, as the order of data packets sent between the Internet and the subscriber terminal may be lost due to variations in the transmission delays between different B-channels. Also, IP does not provide a mechanism whereby packets having the same IP address can be sent via different IASs.

It often transpires that when a low bandwidth access has been provided to a subscriber terminal, and that terminal subsequently requests additional bandwidth (i.e. using Multilink PPP), the allocated IAS cannot provide that bandwidth and multilink access cannot therefore be provided. Whilst it is possible to always reserve spare capacity on an IAS for a subscriber terminal already allocated a channel on that IAS, this may be wasteful of bandwidth resources.

This problem could be alleviated by increasing the capacity provided by an IAS. However, capacity is a function of processor power, power consumption, board size, etc. and cannot easily be achieved. An alternative solution which has been proposed involves connecting several IASs (which are usually provided in the form of printed circuit boards loaded into racks of an exchange) to a common multilane cell bus. The disadvantage of this solution is that the number of IAS which can be connected together in this way is limited (due to limits imposed by the capacity of the common bus) and also that a new inter-IAS communication protocol is required.

It is noted that similar problems arise in connecting a subscriber terminal to other types of data networks via data network access servers, where it is desired to utilise a multilink PPP.

SUMMARY OF THE INVENTION

It is an object of the present invention to overcome or at least mitigate the above noted disadvantages. In particular, it is an object of the present invention to provide a switching point for connecting a terminal to a data network using multilink point-to-point protocol.

According to a first aspect of the present invention there is provided a method of connecting a terminal to a data network, wherein the connection is made through a switching point having a plurality of data network access servers coupled to the data network, the method comprising:

in response to an access request received from the terminal, determining whether or not an active connection currently exists for that terminal over one of said data network access servers;

if an active connection does not currently exist, allocating to the terminal, transmission bandwidth on one of the data network access servers; and if an active connection does exist, identifying the data network access server on which transmission bandwidth is allocated to the terminal, allocating additional bandwidth to the terminal on that data network access server if available or, if not available, transferring the active connection to a second data network access server on which sufficient bandwidth is available.

By ensuring that transmission bandwidth for a given terminal is always allocated on a single data network access server, embodiments of the present invention ensure that multilink point-to-point protocol can be used as the communication protocol between the terminal and the data network.

In certain embodiments of the invention, the data network is a wide area network such as the Internet, in which case the data network access servers are Internet access servers.

The switching point at which the data network access servers are provided may be an exchange of a telephone network in which case the terminal may be connected to the exchange via a telephone line of the telephone network or via a wireless telephone communication channel.

The terminal may be connected to a further data network, e.g. a Local Area Network (LAN), and through that network to the switching point.

The terminal may be a subscriber terminal on which is run a user application, e.g. a Web browser. Alternatively, the terminal may provide a routing functionality for other, end-user terminals connected to the first mentioned terminal by a Local Area Network (LAN) or a Wide Area Network (WAN).

According to a second aspect of the present invention there is provided apparatus for connecting a terminal to a data network, the apparatus comprising a switching point having a plurality of data network access servers coupled in parallel to the data network, and processing means associated with the switching point, the processing means being arranged, in response to an access request received from the terminal, to:

determine whether or not an active connection currently exists for that terminal over one of said data network access servers;

if an active connection does not currently exist, to allocate to the terminal transmission bandwidth on one of the data network access servers; and if an active connection does exist, to identify the data network access server on which transmission bandwidth is allocated to the terminal, and to allocate additional bandwidth to the terminal on that data network access server if available or, if not available, to transfer the active connection to a second data network access server on which sufficient bandwidth is available.

In one embodiment of the above second aspect of the present invention, the data network is the Internet and said data network access servers are Internet access servers. More preferably, the switching point is an exchange of a telephone network, and the network comprises a telephone line, or wireless radio telephone link, coupling the terminal to the exchange.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF EMBODIMENTS

Figure 1:
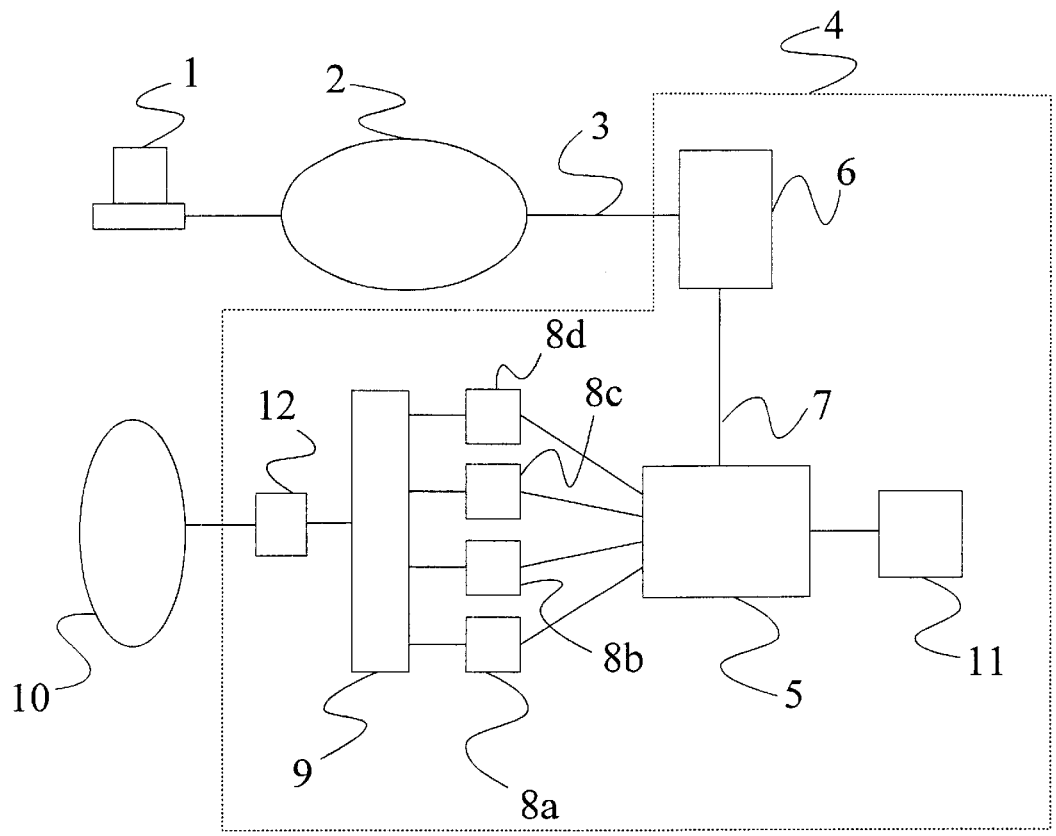
FIG. 1 shows schematically the architecture of a public telephone network connecting a subscriber terminal to the Internet.

There is illustrated in FIG. 1 a personal computer (PC) 1 which is connected to a Local Area Network (LAN) 2. The LAN 2 typically provides a data communication network for intra-office or intra-premise communication. The LAN 2 has a server (not shown in FIG. 1) which controls the LAN and connects it to a subscriber line 3 of a public telephone network 4.

A connection may be made between the subscriber line and a switching exchange 5 of the network 4 via a concentrator 6. The concentrator receives many different subscriber lines and multiplexes/demultiplexes signals between those lines and a high capacity trunk line 7 connecting the concentrator 6 to the exchange 5. Connections between the concentrator 6 and the exchange 5 may sometimes make use of further, intermediate switching exchanges although these are not shown in FIG. 1. For the purpose of the present example, the telephone network 4 is assumed to use the Integrated Services Digital Network (ISDN) user-network interface for communications between the LAN 2 and the exchange 5.

The exchange 5 is coupled to a number (in this case four) of Internet Access Servers (IASs) 8a to 8d which in turn are connected in parallel to a hub 9. The hub 9 acts as a multiplexer/demultiplexer between the IASs 8 and a router 12 via which the telephone network 4 is connected to the "open" Internet. Each IAS 8 is provided by a printed circuit board installed in a rack of the exchange 5.

Figure 2:
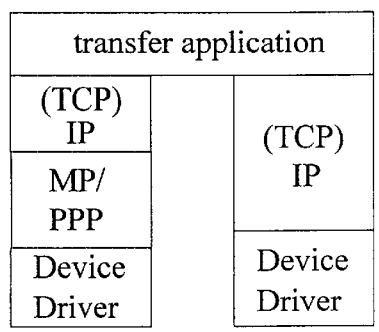
FIG. 2 illustrates generally the protocol stacks provided in Internet Access Servers of the network of FIG. 1.

The exchange 5 is connected to each IAS 8 by a line which provides 32 64 Kbits/sec channels. A subscriber terminal is allocated one of these channels on request, such that a circuit-switched connection can be established between the subscriber terminal 1 and an IAS 8. Point-to-Point Protocol (PPP) is used to establish (including allocating an IP address to the subscriber terminal) and control the channel between the subscriber terminal 1 and the allocated IAS 8. The protocol stacks present in the IAS 8 are illustrated in FIG. 2, where the left hand stack provides for communications with the subscriber terminal 1 whilst the right hand stack provides for communications with the Internet.

The exchange 5 has, or is connected to, a channel allocation controller 11 which may comprise a microprocessor or digital signal processor with associated memory. The controller 11 maintains a record or database of subscriber identities (i.e. subscriber line numbers) for which an active Internet connection currently exists and, for each such identity, the allocated bandwidth (i.e. number of B-channels) and IAS 8. The controller 11 also controls the allocation of IASs and transmission channels to subscriber lines in dependence upon the data stored in its database.

Consider the case where a subscriber terminal 1 requests for the first time a low bandwidth Internet access, via the server in its LAN 2. This request is made by dialling from the server a predefined telephone number which routes the call and the request to the exchange 5. The exchange recognises the nature of the call and allocates to the subscriber a transmission B-channel to a certain one of the IASs 8a using PPP. The controller 11 then records the telephone number (A-number) of the caller together with the IAS 8a allocated to the subscriber and the transmission bandwidth (i.e. one channel).

Figure 3:
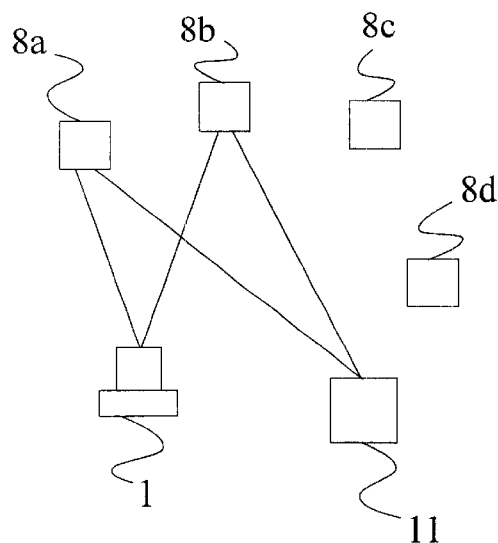
FIG. 3 illustrates functionally the connectivity between a subscriber terminal and Internet access servers of the network of FIG. 1 immediately following a request for further transmission bandwidth.

In the event that the subscriber requires additional transmission bandwidth for communicating with the Internet, a new call is made to the same predefined telephone number and the request is passed to the exchange 5. Again the exchange 5 allocates to the subscriber a B-channel to one of the IASs 8b where capacity for that channel exists and the PPP connection is set up. The controller 11 records details of the connection in its database. This situation is illustrated functionally in FIG. 3.

At this point, the controller 11 interrogates its database to determine whether or not a prior active connection exists for the subscriber. In the present example, this interrogation confirms that an active connection does indeed currently exist. The controller then determines whether or not both B-channels allocated to the subscriber are routed through the same IAS 8—again, in the case of the present example, the returned result is that the two channels are routed through different IASs 8a and 8b.

Figure 4:
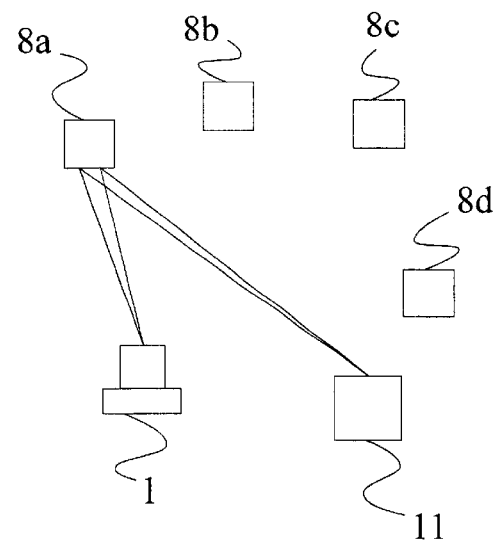
FIG. 4 illustrates a subsequent modification to the connectivity of FIG. 3.
Figure 5:
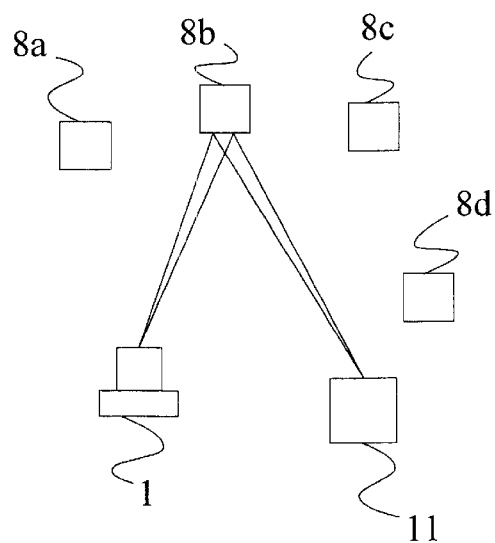
FIG. 5 illustrates a subsequent, alternative modification to the connectivity of FIG. 3.

As has already been discussed above, in order to make use of Multilink PPP (MP), the channels making up that link must be routed through the same IAS 8. However, the chosen IAS 8 must have sufficient capacity to cope with the plurality (in this example two) of channels making up the multilink. The controller 11 therefore interrogates its database to determine if sufficient spare capacity exists in the IAS 8a. If the answer is yes, then the second channel, currently routed through IAS 8b, is transferred to the IAS 8a. This situation is illustrated functionally in FIG. 4. If the answer is no, and sufficient capacity exists for a second channel on the IAS 8b, then the first channel is transferred to that IAS 8b. This is illustrated in FIG. 5. Of course, it may be that sufficient capacity does not exist in either IAS 8a or 8b, in which case the controller 11 determines whether sufficient capacity for two additional channels exists in either IAS 8c or 8d and, if so, transfers both channels to the identified IAS 8c or 8d. Accordingly, protocol (e.g. Point-to-Point Protocol) parameters, negotiated at the establishment of the protocol connection between near-end and far-end, and actual protocol state should be transferred to the same IAS 8 as the channels. If needed, depending on the network structure, also routing information on the packet network side should be updated.

Figure 6:
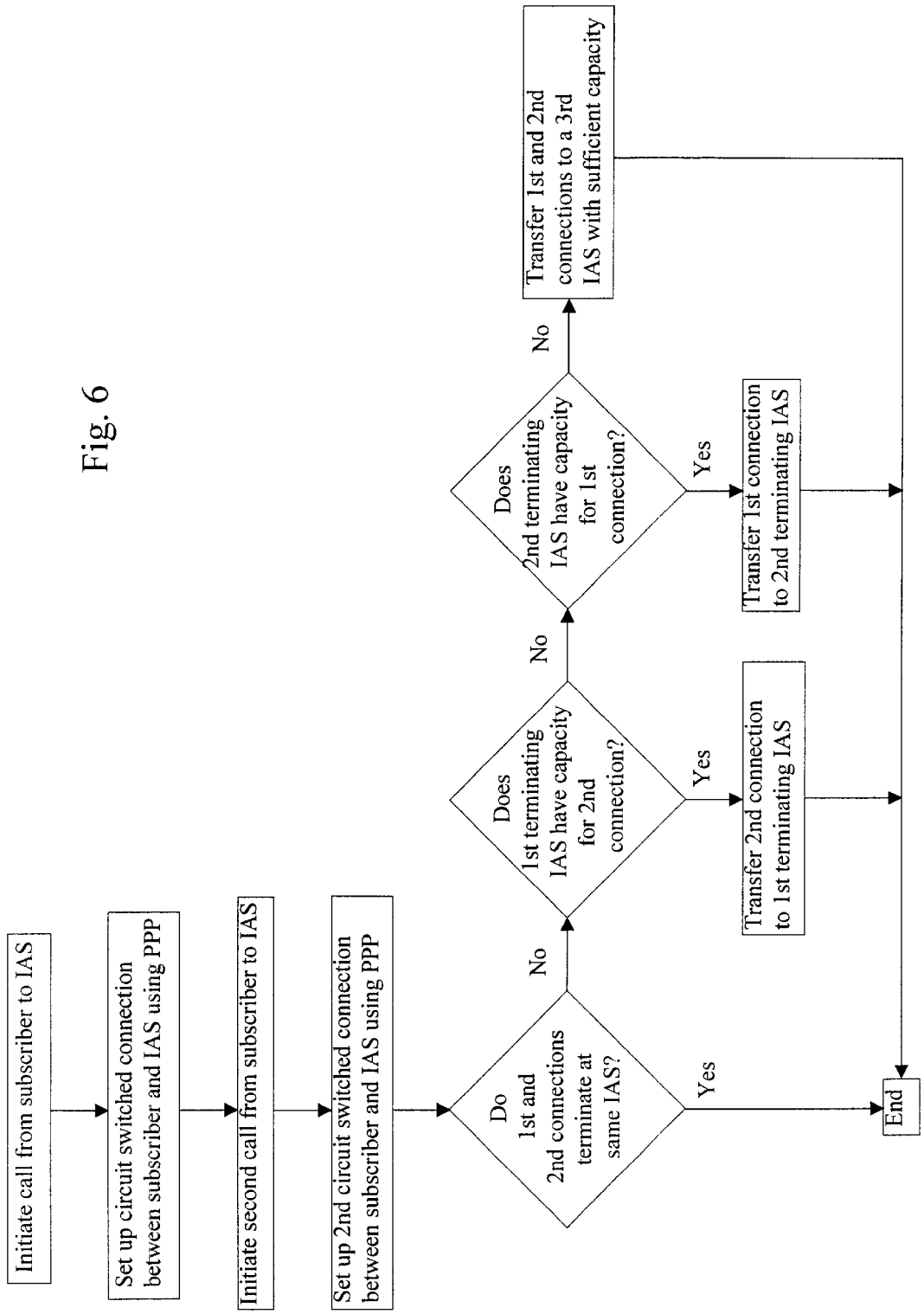
FIG. 6 is a flow diagram illustrating the method of operation of the network of FIG. 1.

The method of operation of the network of FIG. 1 is further illustrated by the flow chart of FIG. 6.

It will be appreciated by the skilled person that various modifications may be made to the above described embodiment without departing from the scope of the present invention. For example, whilst the above embodiment has been described with reference to Multilink PPP, any similar protocol may be used which allows two or more distinct channels to be effectively merged into a single higher bandwidth channel, for example Multilink+ PPP. In another modification, the PPP or MP connection is established between the IAS and the server of the LAN 2. The server then routes data to and from the subscriber terminals connected to the LAN.

What is claimed is:

1. A method of connecting a terminal to a data network, wherein the connection is made through a switching point having a plurality of data network access servers coupled to the data network, the method comprising:

in response to an access request received from the terminal, determining whether or not an active connection currently exists for that terminal over one of said data network access servers;

if an active connection does not currently exist, allocating to the terminal, transmission bandwidth on one of the data network access servers; and if an active connection does exist, identifying the data network access server on which transmission bandwidth is allocated to the terminal, allocating additional bandwidth to the terminal on that data network access server if available or, if not available, transferring the active connection to a second data network access server on which sufficient bandwidth is available.

2. A method according to claim 1, wherein multilink point-to-point protocol or multilink+ point-to-point protocol is used as the communication protocol between the terminal and the data network.

3. A method according to claim 1, wherein the data network is the Internet and the data network access servers are Internet access servers.

4. A method according to claim 1, wherein the switching point at which the data network access servers are provided is an exchange of a telephone network.

5. A method according to claim 4 and comprising connecting the terminal to the exchange via a telephone line of the telephone network or via a wireless telephone communication channel.

6. A method according to claim 1, wherein the steps of allocating bandwidth each comprise allocating a B-channel on an ISDN link between the exchange and a network access server.

7. A method according to claim 1 and comprising connecting the terminal to a further data network and through that network to the switching point.

8. Apparatus for connecting a terminal to a data network, the apparatus comprising a switching point having a plurality of data network access servers coupled in parallel to the data network, and processing means associated with the switching point, the processing means being arranged, in response to an access request received from the user terminal, to:

determine whether or not an active connection currently exists for that terminal over one of said data network access servers;

if an active connection does not currently exist, to allocate to the terminal transmission bandwidth on one of the data network access servers; and if an active connection does exist, to identify the data network access server on which transmission bandwidth is allocated to the terminal, and to allocate additional bandwidth to the terminal on that data network access server if available or, if not available, to transfer the active connection to a second data network access server on which sufficient bandwidth is available.

9. Apparatus according to claim 8, wherein the data network is the Internet and said data network access servers are Internet access servers.

10. Apparatus according to claim 8, wherein the switching point is an exchange of a telephone network, and the network comprises a telephone line, or wireless radio telephone link, coupling the terminal to the exchange.

* * * * *